United States Patent
Ohbitsu (10) Patent No.: US 8,422,866 B2
(45) Date of Patent: Apr. 16, 2013

(54) SIGNAL OUTPUT DEVICE, SIGNAL OUTPUT METHOD AND READABLE-BY-COMPUTER RECORDING MEDIUM

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 791 days.

(21) Appl. No.: 12/603,834

(22) Filed: Oct. 22, 2009

(65) Prior Publication Data

US 2010/0046907 A1    Feb. 25, 2010

Related U.S. Application Data

(63) Continuation of application No. PCT/JP2007/059160, filed on Apr. 27, 2007.

(51) Int. Cl.
*H04N 5/94*    (2006.01)

(52) U.S. Cl.
USPC .......................................................... 386/264

(58) Field of Classification Search ........................ None
See application file for complete search history.

(56) References Cited

U.S. PATENT DOCUMENTS

| | | | | |
|---|---|---|---|---|
| 6,081,296 A | * | 6/2000 | Fukunaga et al. | 375/240.12 |
| 6,810,377 B1 | * | 10/2004 | Ho et al. | 704/208 |
| 2003/0044089 A1 | * | 3/2003 | Yamamoto | 382/300 |

FOREIGN PATENT DOCUMENTS

| | | |
|---|---|---|
| JP | 6-350983 | 12/1994 |
| JP | 11-289498 | 10/1999 |
| JP | 2002-41088 | 2/2002 |
| JP | 2005-20047 | 1/2005 |
| JP | 2005-260606 | 9/2005 |

OTHER PUBLICATIONS

International Search Report, mailed May 29, 2007, in corresponding International Application No. PCT/JP2007/059160 (1 pg.)
International Preliminary Report on Patentability, mailed Nov. 19, 2009, in corresponding International Application No. PCT/JP2007/059160 (5 pp.)

* cited by examiner

*Primary Examiner* — Thai Tran
*Assistant Examiner* — Sunghyoun Park
(74) *Attorney, Agent, or Firm* — Staas & Halsey LLP (57) ABSTRACT

A signal output device, has an output signal generating unit 23 generating the output signals based on the input data, an output control unit 21 outputting the output signals to a reproducing device, a detecting unit 27 which detects missing of the input data, and a substitute data generating unit 28 generating, when the detecting unit 27 detects the missing of the input data, with the exception of a portion with the missing detected, substitute data by averaging at least any one of input data posterior to the missing portion and input data anterior to the missing portion, as data for a period of reproducing time obtained by adding a period of reproducing time related to the input data to a period of reproducing time related to the missing portion, and the output signal generating unit 23 generates the output signals based on the substitute data.

9 Claims, 8 Drawing Sheets

FIG. 1

SPS1 | PPS1 | SEI1 | IDR1 | SPS2 | PPS2 | SEI2 | IDR2 ...

(NECESSARY CASE)   (NECESSARY CASE)

SIGNAL OUTPUT DEVICE, SIGNAL OUTPUT METHOD AND READABLE-BY-COMPUTER RECORDING MEDIUM

CROSS-REFERENCE TO RELATED APPLICATION

This is a continuation of Application PCT/JP2007/059160, filed on Apr. 27, 2007, now pending, the contents of which are herein wholly incorporated by reference.

FIELD

The present invention relates to a signal output device, a signal output method and a signal output program for outputting output signals based on inputted moving picture data and audio data.

BACKGROUND

There exists a method of storing TS (Transport Stream) packets in an interpolation correction processing unit, compares a storage sequence thereof with sequence information contained in the TS packet, and, if there is a discrepancy therebetween, reorganizes pictures by generating a missing packet (refer to Patent document 1).

Further, another technology (refer to Patent document 2) is that digitized pictures are temporarily stored, if there is a picture of which only one or two frames are largely different from the frames anterior and posterior thereto, this picture is determined to be a subliminal picture, and a frame just anterior thereto is displayed in place of this picture.

[Patent document 1] Japanese Patent Laid-Open Publication No. 2005-260606
[Patent document 2] Japanese Patent Laid-Open Publication No. H11-289498

SUMMARY

Specifically, the present invention is a signal output device including: an output signal generating unit generating output signals based on input data defined as inputted moving picture data or audio data; an output control unit outputting the output signals generated by the output signal generating unit to a reproducing device; a detecting unit detecting missing of the input data; and a substitute data generating unit generating, when the detecting unit detects the missing of the input data, with the exception of a portion with the missing detected, substitute data by averaging at least any one of input data posterior to the missing portion and input data anterior to the missing portion, as data for a period of reproducing time obtained by adding a period of reproducing time related to the input data to a period of reproducing time related to the missing portion, wherein the output signal generating unit, when the detecting unit detects the missing of the input data, generates the output signals based on the substitute data.

The object and advantage of the embodiment will be realized and attained by means of the elements and combinations particularly pointed out in the claims. It is to be understood that both the foregoing general description and the following detailed description are exemplary and explanatory only and are not restrictive of the invention, as claimed.

DESCRIPTION OF EMBODIMENTS

<First Embodiment>

An embodiment will hereinafter be described with reference to the drawings in such a case that an information apparatus according to the present invention is embodied by way of a personal computer having a one-segment (1-seg) broadcast viewing function. A configuration in the following embodiment is an exemplification, and the present embodiment is not limited to the configuration of the embodiment.

The one-segment broadcasting involves using H.264/AVC (H.264/Advanced Video Coding) (a level 1.2, 320×240 or 320×180, a minimum frame interval $1/15$ sec) as a compression coding system of moving picture data. This coding system adopts picture generation based on an interframe prediction as a method of generating a picture from the compressed moving picture data.

Figure 1:
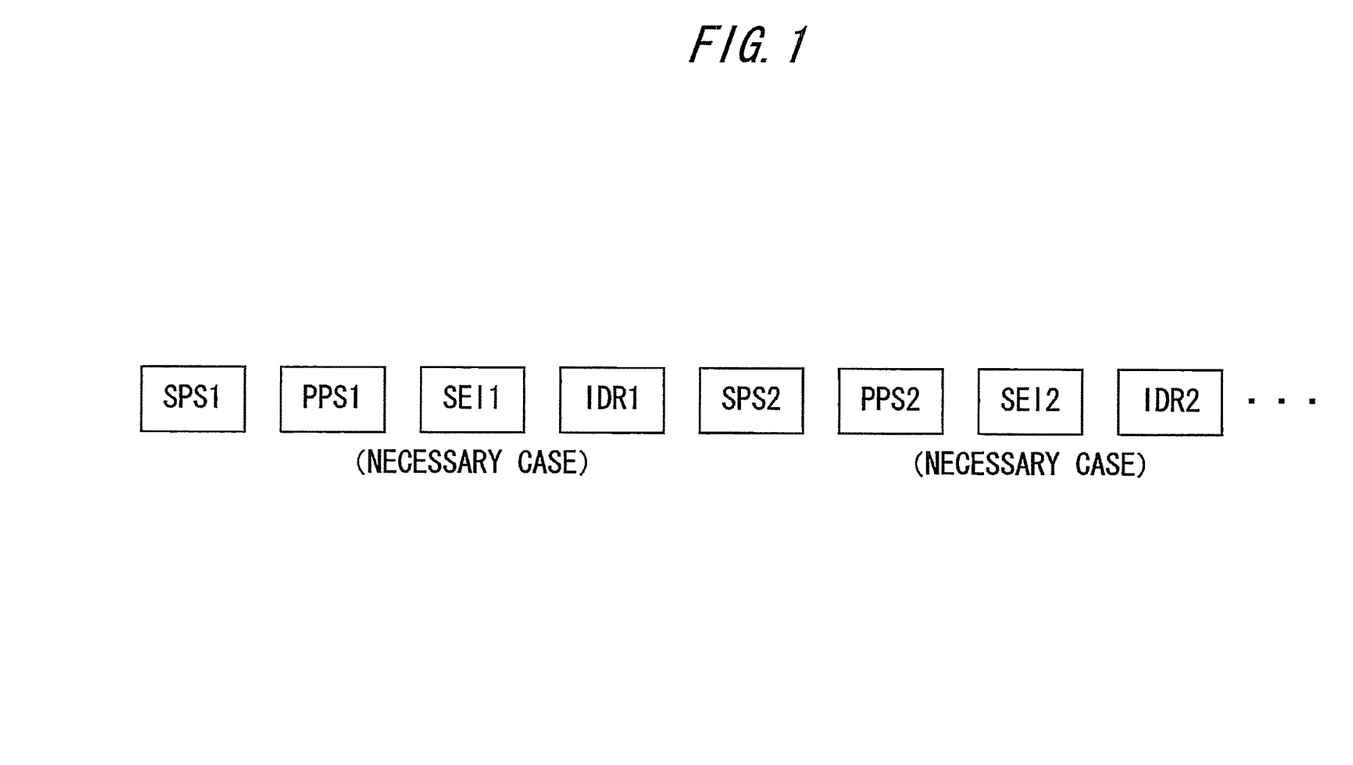
FIG. 1 is a diagram illustrating a data structure of H.264/AVC.

FIG. 1 is a diagram illustrating a data structure of the H.264/AVC. The H.264/AVC includes SPS (Sequence Parameter Set) defined as a header containing pieces of information related to codes of the whole sequence, PPS (Picture Parameter Set) as a header indicating a coding mode of the whole picture, SEI (Supplemental Enhancement Information) added if necessary, an IDR picture (Instantaneous Decoding Refresh Picture), etc. The one-segment broadcasting involves performing the interframe prediction from within three pieces of reference pictures and thus generating a P-picture (Predictive Picture). Further, a group of aggregated frames delimited by the IDR picture is called a GOP (Group of Picture). In the embodiment, the GOP is composed of 15 frames per second estimated as a period of reproducing time.

The personal computer according to the embodiment is a personal computer which includes a one-segment broadcast receiving tuner and a one-segment broadcast decoding means, displays a picture based on decoded video signals on a display unit (display), and reproduces a sound (voice) based on decoded audio signals, thereby enabling the one-segment broadcast to be viewed. This type of personal computer fails to receive the frames temporarily due to generation of radio waves from devices themselves provided in the personal computer, and it is considered that missing data occurs.

Herein, the conventional one-segment broadcast viewing apparatus, if the missing data occurs, has a problem that the picture or the sound with deficiency of information is output as it is or neither the picture nor the sound is output (blackout).

Such being the case, the personal computer according to the embodiment gives a delay output while buffering the data for 3 sec as the reproducing time (i.e., without deleting the data from a memory of the computer), and, if there is the missing moving picture data or the missing audio data, performs slow reproduction (slow playback) based on the buffered data, thereby preventing occurrence of a picture intermittence or a sound intermittence in the missing frames.

Namely, according to the personal computer of the embodiment, even when there is the missing moving picture data or audio data, it is feasible to output the video signals and the audio signals by displaying the pictures and reproducing the sounds without giving any sense of discomfort to the viewer in a way that neither outputs the picture with the deficiency of information nor blacks out the picture nor causes the intermittence of voice.

In the embodiment, a quantity of the input data to be buffered is converted into 3 sec as the time in the case of reproducing the moving picture and the sound. For example, the one-segment broadcasting format for the moving picture data provides 15 frames per sec, and hence the moving picture data of approximately 454 frames is buffered. It is preferable that the buffer quantity and the delay time are set large to the greatest possible degree, however, the buffering time is set to 3 sec in the embodiment by taking into consideration a delay allowable range on the occasion of the actual viewing and a size of a buffer area that can be ensured on the personal computer. It is, however, preferable that the buffer quantity and the delay time are properly set to optimal values according to every embodiment. For instance, a thinkable scheme is that an ensurable capacity of a main memory is increased by terminating a resident application and an unnecessary application or by not using a part of the main memory as a video memory (providing an independent video memory), whereby the buffer quantity is augmented.

Moreover, the personal computer according to the embodiment conducts the 3-sec delay output by use of this buffer. To be specific, the one-segment broadcast is viewed through on the personal computer according to the embodiment, in which case the picture and the sound are output with the 3-sec delay as compared with a case of viewing the broadcast through on a general type of another one-segment broadcast viewing apparatus. The thus-conducted delay output, even if the moving picture data or the audio data is missed due to the missing data, enables the picture or the sound of the missing frame to be interpolated by slow-reproducing the not-yet-output data buffered without outputting the missing video signals or audio signals as they are.

<Functional Configuration of Personal Computer>

Figure 2:
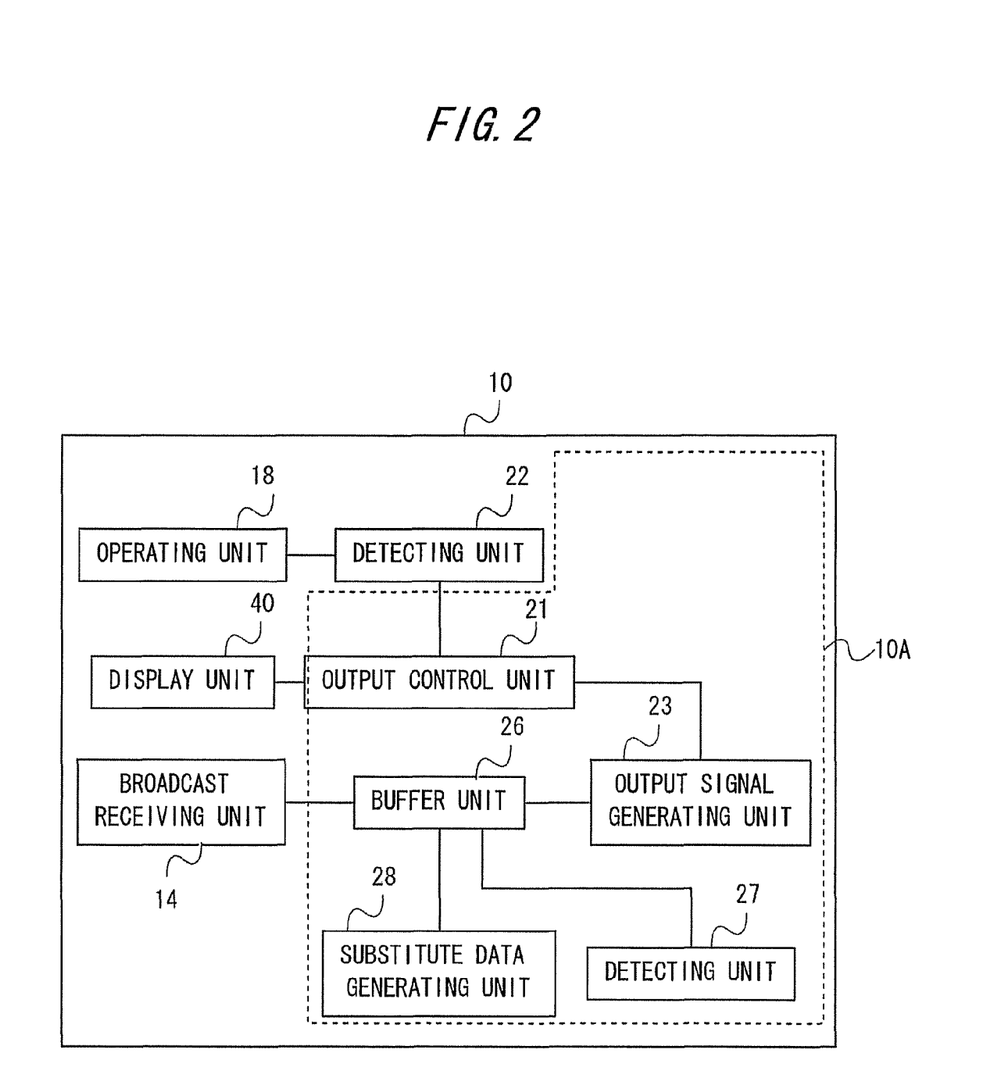
FIG. 2 is a diagram of a functional configuration of a personal computer according to an embodiment.

FIG. 2 is a diagram of a functional configuration of a personal computer 10 according to the embodiment. The personal computer 10 includes an operating unit 18 which operates the personal computer 10 upon receiving a user's operation, a detecting unit 22 which detects an operation on the operating unit 18, a broadcast receiving unit 14 which receives a TV broadcast, a signal output device 10A which outputs to a display unit 40 the video signals and the audio signals decoded based on the data output from the broadcast receiving unit 14, and the display unit 40 which displays a broadcast program received by the broadcast receiving unit 14 on the basis of the inputted video signals.

Further, the signal output device 10A includes a buffer unit 26 stored with a fixed quantity of data output from the broadcast receiving unit 14, an output signal generating unit 23 that generates the video signals and the audio signals by decoding the data output from the broadcast receiving unit 14, a detecting unit 27 that detects the missing data, a substitute data generating unit 28 that generates substitute data if the detecting unit 27 detects the missing data, and an output control unit 21 that outputs the video signals and the audio signals to the display unit 40.

These function units can be realized by the computer including the CPU, the memory, etc and by programs executed on the computer.

Herein, the operating unit 18 is exemplified by an input device of the computer, a remote control operating unit constructed by combining an infrared-ray receiving unit with an infrared-ray remote controller, a knob for manipulating a channel, an operation button and so on.

The detecting unit 22 detects an operation (such as switching over a reception channel) on the operating unit 18 via an interface with the CPU, a device driver which processes signals of the interface and OS (Operating System) which transmits and receives the signals to and from the operating unit 18 through the device driver. A dedicated piece of hardware may, however, also be provided as the detecting unit 22. For example, the processes of the CPU may be shared by providing an input signal processing circuit for the operating unit. Known as this type of processing circuit is a keyboard controller, a mouse controller, etc.

Furthermore, for instance, a dedicated input control processor for processing the signals transmitted from the operating unit 18 may also be separately provided. The input control processor may simply convert the signals of the operating unit 18 into predetermined signals and transmit the converted signals to the output control unit 21.

The broadcast receiving unit 14 is a so-called one-segment broadcasting tuner. The broadcast receiving unit 14 receives broadcast waves with an antenna, and outputs a data stream (e.g., TS (Transport Stream) signals) based on the received broadcast waves.

The output signal generating unit 23 acquires the data output from the broadcast receiving unit 14 directly or via the buffer unit 26, and generates the video signals and the audio signals based on the acquired data. The output signal generating unit 23 may be configured as a computer program executed on the CPU. The output signal generating unit 23 may also be, however, configured as a dedicated processor which generates the video signals and the audio signals based on the inputted data and outputs the generated video signals and audio signals.

The buffer unit 26 is temporarily stored with the inputted data. The buffer unit 26 accepts an input of the data output from the broadcast receiving unit 14, and buffers the inputted data for 3 sec as the reproducing time. The buffer unit 26 may be constructed as a volatile memory, with a power source backed up, controlled by the computer program executed on the CPU, a nonvolatile memory such as a flash memory and a recording medium like a hard disc or a portable medium etc. The buffer unit 26 may also be, however, constructed as a dedicated memory which buffers the inputted data.

The output control unit 21 has an interface with the display unit 40, and controls the video signals and the audio signals that are output to the display unit 40. The output control unit 21 outputs, based on the signal detected by the detecting unit 22, the video signals and the audio signals generated by the output signal generating unit 23 to the display unit 40. On this occasion, the output control unit 21 outputs the signals with the 3-sec delay from the time when receiving the broadcast. The output control unit 21 may be configured as the computer program executed on the CPU. The output control unit 21 may also be, however, constructed as a dedicated processor which outputs the video signals and the audio signals.

The detecting unit 27 monitors integrity of the data (inputted data) inputted from the broadcast receiving unit 14, and detects the missing data. The detecting unit 27, when the missing data is detected, specifies a data block (which is the GOP if in the case of the moving picture) containing the occurrence of the missing data, and notifies the substitute data generating unit 28 of this purport. The substitute data generating unit 28, upon receiving this notification, starts a substitute data generating process.

The substitute data generating unit 28, when the detecting unit 27 detects the occurrence of the missing data, acquires a data block for conversion, and generates the substitute data for interpolating the video data and the audio data of the missing frames by averaging the acquired data block. An in-depth description of the process by the substitute data generating unit 28 will be made with reference to FIGS. 4 and 5. Further, the display unit 40, which is a so-called monitor/speaker unit, displays the picture and reproduces the sound by receiving the video signals and the audio signals output from the output control unit 21.

<Configuration of Personal Computer>

Figure 3:
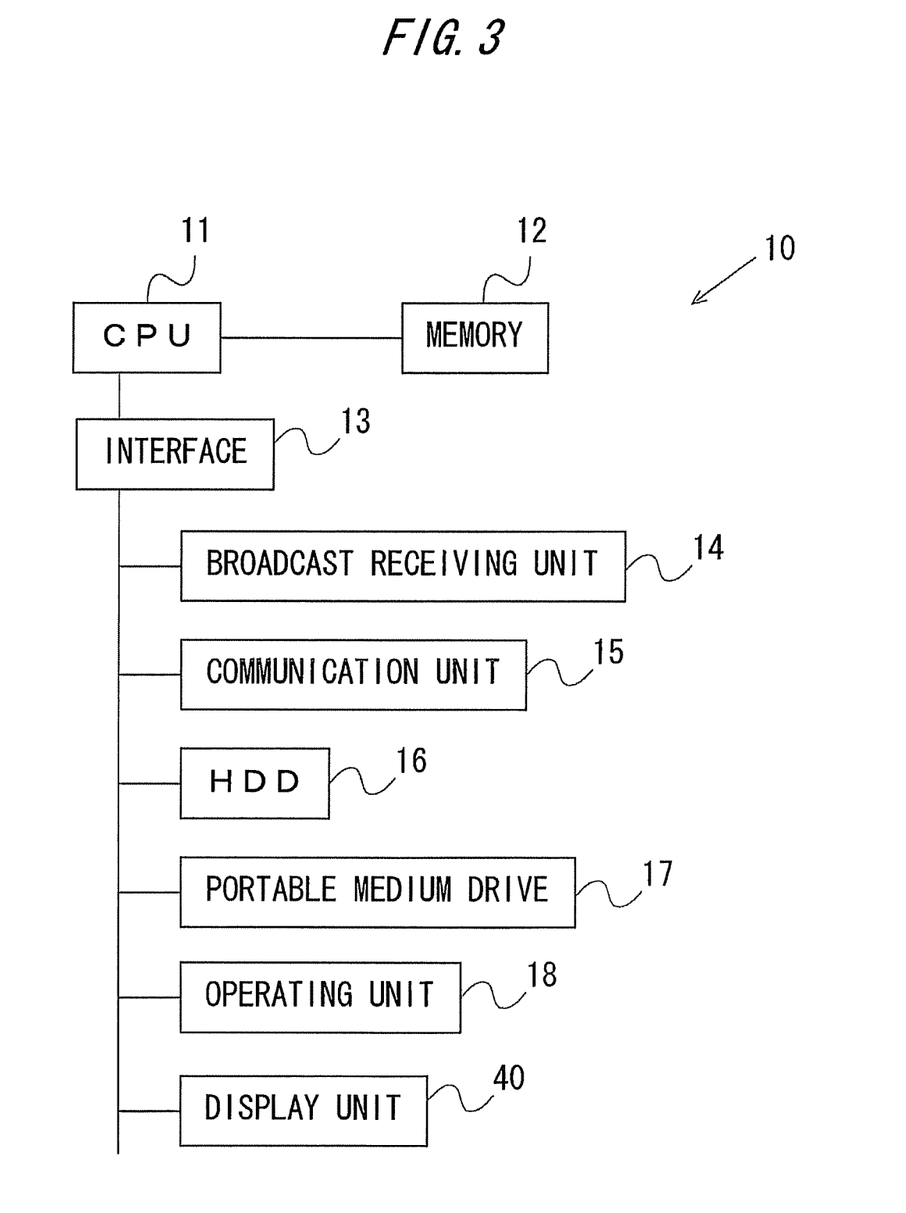
FIG. 3 is a diagram illustrating an example of a detailed configuration of the personal computer according to the embodiment.

FIG. 3 is a diagram illustrating an example of a detailed configuration of the personal computer according to one embodiment of the present invention. As in FIG. 3, the personal computer 10 has a CPU 11 executing the computer program and thus controlling the personal computer 10, a memory 12 stored with the computer program executed on the CPU 11 or the data processed by the CPU 11, an interface 13 for connecting the CPU 11 to a variety of devices, and devices such as the broadcast receiving unit 14, a communication unit 15, a hard disc drive 16, a portable medium drive 17 the operating unit 18 and the display unit 40, which are connected via the interface 13.

Herein, the CPU 11 executes the computer program and controls the respective units of the personal computer 10, thereby making the personal computer 10 function as the device including the detecting unit 22, the broadcast receiving unit 14, the output control unit 21, the output signal generating unit 23, the buffer unit 26, the detecting unit 27, the substitute data generating unit 28 and the output control unit 21. The memory 12 is stored with the programs executed on the CPU 11 and the data processed by the CPU 11. The memory 12 includes a volatile RAM (Random Access Memory) and a nonvolatile ROM (Read Only Memory). The ROM includes a rewritable semiconductor memory such as a flash memory, an EPROM (Erasable Programmable Read-Only Memory) and an EEPROM (Electrically Erasable Programmable Read-Only Memory).

The interface 13 may be a serial interface such as USB or any one of parallel interfaces such as PCI (Peripheral Component Interconnect), ISA (Industry Standard Architecture), EISA (Extended ISA), ATA (AT Attachment), IDE (Integrated Drive Electronics), IEEE1394 and SCSI (Small Computer System Interface). Incidentally, FIG. 3 illustrates the interface 13, however, the CPU 11 may be connected via different interfaces to the individual devices. Further, a plurality of interfaces may also be bridge-connected.

The broadcast receiving unit 14 is a TV tuner for the one-segment broadcasting. The broadcast receiving unit 14 includes, in addition to a high-frequency unit having a tuning circuit and an amplifier, a digital signal decoder (an OFDM (orthogonal Frequency Division Multiplexing) demodulator).

Herein, the high-frequency unit converts high-frequency electromagnetic waves into baseband signals. Further, the OFDM demodulator, which includes an FFT (Fast Fourier Transform) processing circuit and an orthogonal demodulator, generates digital signals from the baseband signals. These processes may be configured by a dedicated digital circuit executing a sum-of-product operation. Moreover, these processes may also be configured by a processor such as a DSP (Digital Signal Processor) and a program. Further, an LSI for demodulation, which is manufactured based on the TV Broadcasting Standards and available on the market, may also be used.

The communication unit 15 is an interface with a broadband network. The broadband network is a cable network such as a LAN (Local Area Network), a cable TV network, xDSL (x Digital Subscriber Line), ADSL and an optical network, or a wireless accessible network such as a wireless LAN and Fixed Wireless Access (FWA). The communication unit 15 acquires the computer program installed into the hard disc drive 16 and an Electronic Program Guide (EPG) for the TV broadcasts from, e.g., a server on the network. These broadband networks can be generally connected to the Internet.

The hard disc drive 16 is stored with the programs loaded into the memory 12. Furthermore, the hard disc drive 16 is stored with the data processed by the CPU 11.

Note that the hard disc drive 16 is not limited to the single drive, but a plurality of drives 16 may also be provided. Moreover, the hard disc drive 16 may be a drive managed by another computer, e.g., a disc server on the network. In this case, it is sufficient that the CPU 11 performs communications with the disc server via the communication unit 15. Then, the CPU 11 may display the EPG etc acquired from the disc server on the display unit 40.

The portable medium drive 17 is a drive for a CD (Compact Disc), a DVD (Digital Versatile Disk), a HD-DVD, Blu-ray Disc, etc. Further, the portable medium drive 17 may also be a card medium input/output device having the nonvolatile memory such as the flash memory. A medium driven by the portable medium drive 17 retains, e.g., the computer program installed into the hard disc drive 16 and the input data.

The operating unit 18 is an input device, e.g., a keyboard, a pointing device, etc of the computer. Furthermore, the operating unit 18 includes the remote control operation unit constructed by combining the infrared-ray receiving unit with the infrared-ray remote controller, a variety of switches and the knob for manipulating the channel. A type of the pointing device is not particularly limited, and the pointing device is exemplified such as a mouse, a trackball, a dial type operation unit, a stick type device which moves a pointer on the display unit 40, a device having an electrostatic capacity by which a finger manipulation of the user is detected, a touch panel and a joystick, in which a proper type of device may be employed depending on characteristics of the personal computer 10 and needs of the user.

The keyboard transmits an electric signal corresponding to an inputted key in accordance with the input operation of the user to an unillustrated keyboard controller. The keyboard controller transmits a code corresponding to this electric signal to the CPU 11.

The pointing device, upon detecting the user's operation, transmits the operation signal to an unillustrated pointing device controller (which is, e.g., an unillustrated mouse controller or the interface 13). The pointing device controller receiving the operating signal transmits information for generating an operation direction and an operation quantity to the CPU 11. The device driver of the CPU 11 displays and moves, based on the operation signal from the pointing device controller, a pointer on the screen of the display unit 40.

Further, the OS of the CPU 11 determines a positional relationship between the pointer and an object (such as a window button, a menu and a list, etc) on the screen. Then, the object located in a position where the pointer exists is set in a selecting status or a focusing status. Moreover, the selection of the object is determined by a selection determining operation on the pointing device, e.g., by pressing the mouse button.

The display unit 40 is exemplified by a liquid crystal display device, a plasma display panel, a CRT (Cathode Ray Tube) and an electroluminescence panel. Note that the display unit 40 includes, though not illustrated, the RAM stored with the picture data and a drive circuit for driving the display unit 40 on the basis of the data in the RAM. The RAM stored with the picture data and the drive circuit for driving the display unit 40 may, however, be provided independently as picture processing boards. In this case, pieces of data organizing the screen information from the CPU 11 are inputted to the picture processing boards.

Furthermore, the display unit 40 is attached with a loud speaker and outputs the sounds based on the audio signals output from the output control unit 21 and voices (sounds) read from the hard disc drive 16 or the portable medium drive 17 and reproduced by an unillustrated voice synthesizing board. The voice synthesizing board converts the digital data of, e.g., MP3 (MPEG Audio Layer-3) etc into the voices (sounds).

The information apparatus according to the present invention can be configured as the personal computer 10 described above. The information apparatus is not, however, limited to the personal computer but may be other types of devices, e.g., a TV receiving device, having the same functions. Further, the information apparatus can be actualized by a tuner for receiving the TV broadcasting, a set-top box, a mobile phone with the TV broadcast receiving function, a Personal Digital Assistant (PDA), a game machine, an on-vehicle device with the TV broadcast receiving function, etc.

Figure 4:
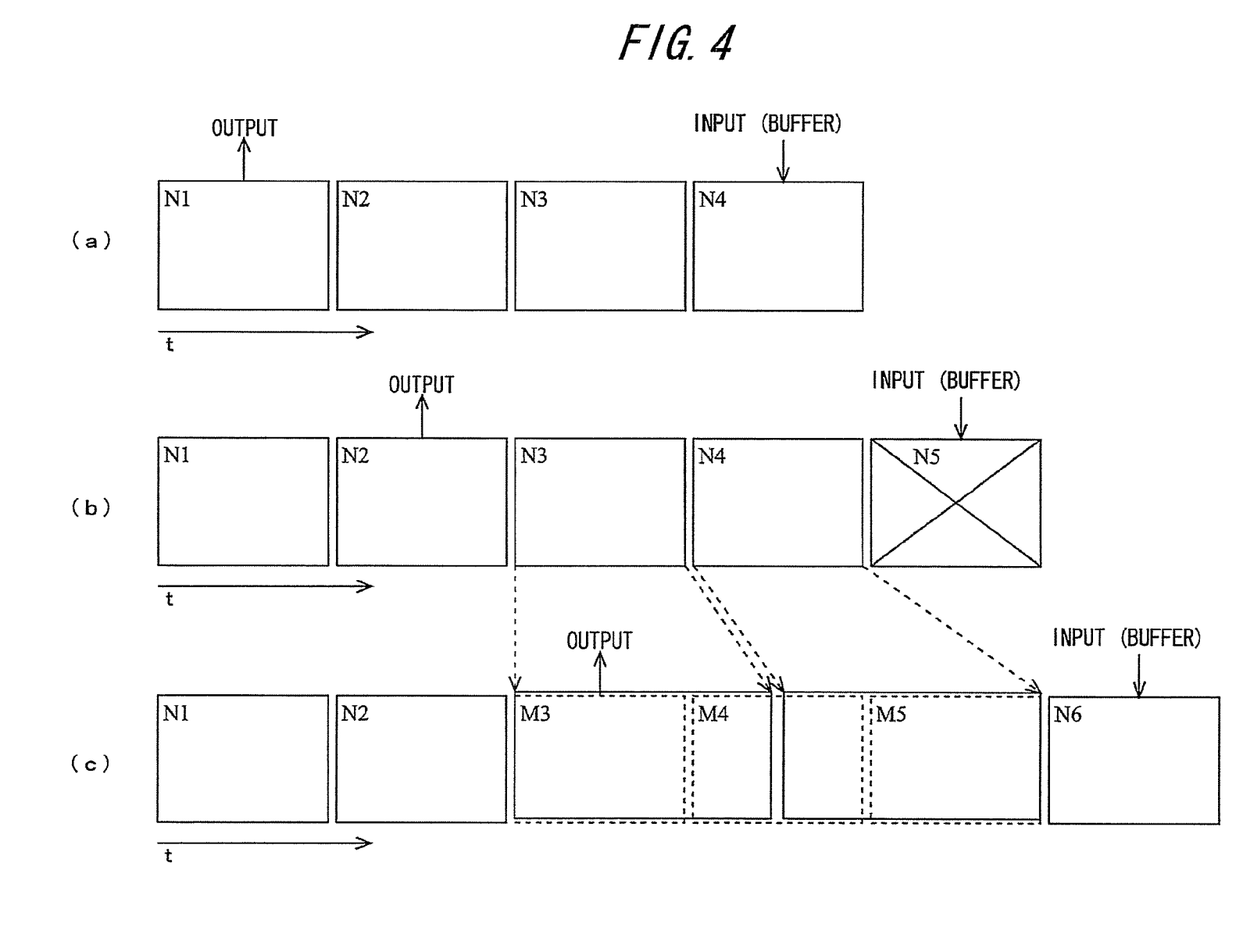
FIG. 4 is a diagram illustrating an outline of a substitute data generating process (1) in the embodiment.

FIG. 4 is a diagram illustrating an outline of a substitute data generating process (1) in the embodiment. The substitute data generating process is executed by the substitute data generating unit 28. FIG. 4(a) depicts a status in which the normal input data is received and output. A rectangle in FIG. 4 represents a data block per sec, and the data is inputted in the sequence of N1, N2, N3, ... The personal computer according to the embodiment buffers the data for 3 sec and therefore outputs, when N4 is inputted, N1 that has been inputted 3 sec earlier.

FIG. 4(b) depicts a status after 1 sec from the status in FIG. 4(a). Herein, if the data of the data block N5 to be inputted is not normal and when the processing proceeds as it is, it follows that the abnormal data is to be output after 3 sec. This being the case, a scheme in the embodiment is that the data blocks N3 and N4 anterior to the abnormal data block N5 but posterior to the N2 defined as the present output point are averaged into substitute blocks M3-M5 as substitutes for N3-N5.

FIG. 4(c) illustrates a status after 1 sec from the status in FIG. 4(b). Herein, the output signals (the video signal and the audio signal) generated based on M3 in place of N3 are output. The moving picture and the sound, which have been output and reproduced, are slow-reproduced at a speed that is ⅔ as slow as the speed in the case of executing none of the substitute data generating process (1). Hereafter, M4 and M5 are consecutively output. The displayed moving pictures and sounds after outputting M4 and M5 are likewise slow-reproduced at the speed that is ⅔ as slow as the normal speed.

The substitute data generating process (1) discussed above enables the interpolation of the reproducing time for the missing data block. If trying to output based on the inputted data by directly looping back to the regular reproducing process, however, the operation skips over a motion corresponding to the missing data block (N5 in FIG. 4) and returns to the reproduction at a speed equal to the normal speed instantaneously from the slow-reproduction at the speed that is ⅔ the normal speed, with the result that the viewer viewing the displayed moving pictures and listening to the sounds is affected greatly by the sense of discomfort. Hence, in the embodiment, a substitute data generating process (2), which will hereinafter be described, is executed subsequent to the substitute data generating process (1).

Figure 5:
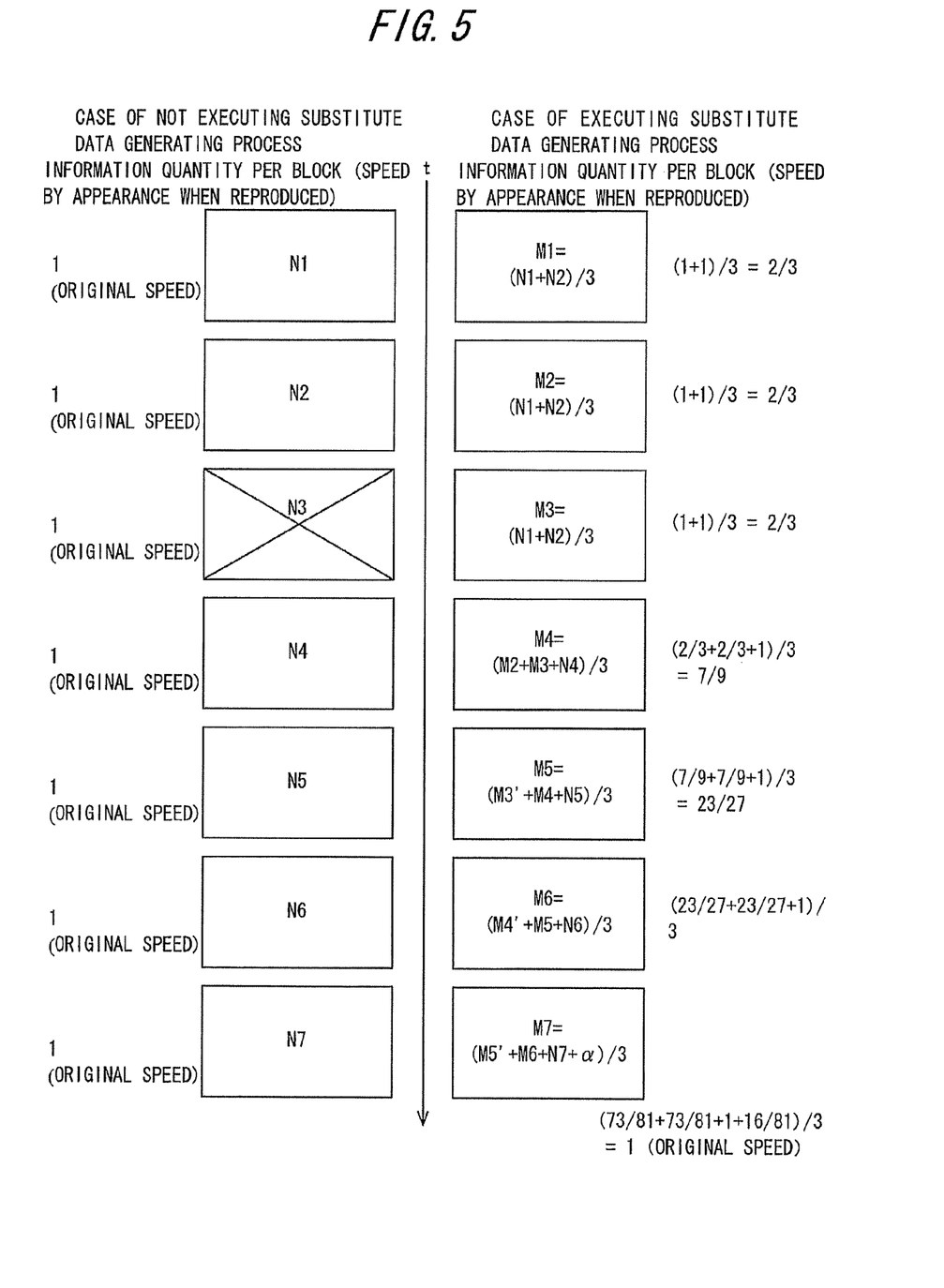
FIG. 5 is a diagram illustrating the outline of the substitute data generating process in the embodiment.
Figure 6:
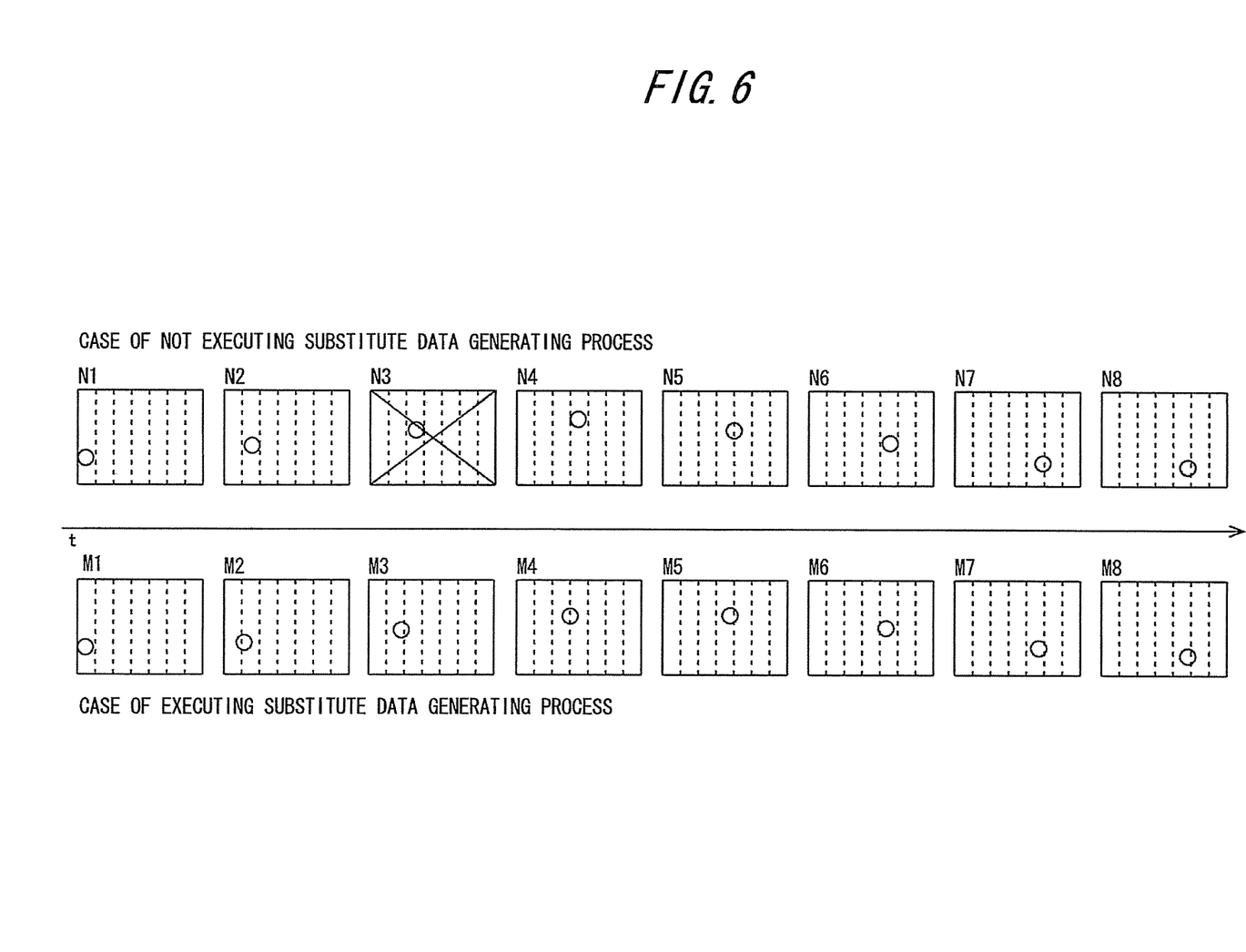
FIG. 6 is a diagram illustrating an example of a picture displayed in the case of executing the substitute data generating process depicted in FIG. 5.

FIG. 5 is a diagram illustrating an outline of the substitute data generating process in the embodiment. Further, FIG. 6 is a diagram illustrating an example of the picture displayed in the case of executing the substitute data generating process depicted in FIG. 5. An assumption in the process depicted in FIG. 5 is that in the substitute data generating process (1), N3 is missed, and N1 and N2 are averaged into M1-M3. Herein, the normal data block N4 is inputted, however, the sense of discomfort affecting the viewer rises for the reason described above, and hence the data block N4 is not output intactly. The substitute data generating unit 28 averages the data of the substitute data blocks M2, M3 averaged in the substitute data generating process (1) and the data of the data block N4 into the substitute data block M4. Incidentally, on the occasion of the averaging process, the picture and the sound related to the missing data block N3 are generated based on a prediction process following the averaging process. For example, in the moving picture data averaging process, the missing motion (missing frame) is compensated by the same prediction process as the interframe prediction described above.

At this time, the information quantity of the substitute data blocks M2, M3 is ⅔ as small as the information quantity of the normal data blocks, and therefore the information quantity of M4 is given by (⅔+⅔+1)/3=7/9, where 7/9 is as small as the information quantity of the normal data block. Namely, the output based on M4 undergoes the slow-reproduction at a speed that is 7/9 as slow as the speed in the case of not executing the substitute data generating process. This speed is slightly faster than in such a case that the speed by appearance when the output signals based on M1 through M3 are regenerated is ⅔ as slow as the normal speed. Hereafter, the averaging into the substitute data blocks M5, M6 is carried out by the same method. On this occasion, as far as the inputted data is not again missed, the new input data used for averaging has the information quantity that is invariably equal to the normal information quantity, and hence the substitute data block gradually approximates the normal information quantity, i.e., the normal speed (see FIG. 6). In the case of the embodiment, the substitute data block M5 has the information quantity (speed) that is 23/27 as small as the normal information quantity, and the substitute data block M6 has the information quantity (speed) that is 73/81 as small as the normal information quantity (refer to the calculation formula in FIG. 5).

Incidentally, the recalculated substitute data block is illustrated with ['(dash)] in the calculation formula depicted in FIG. 5. For instance, M3' used for generating the substitute data block M5 is a data block generated in the averaging process accompanying the generation of the substitute data block M4. Therefore, the information quantity of M3' is 7/9 the normal information quantity unlike the case in which the information quantity of the substitute data block M3 is ⅔ the normal information quantity.

Even when averaging into the substitute data block while adding the new input data in the substitute data generating process (2), so far as the substitute data block generating method involves averaging the data, it does not happen that the information quantity of the substitute data block to be generated is equal to the normal information quantity. To be specific, it follows that there continues a state where the reproducing speed by appearance does not catch up with the normal reproducing speed. Such being the case, in the embodiment, the missing data is compensated in an area where the data blocks containing 80% or more of the mutual data in common are consecutive, thus returning to the normal speed. This process is referred to as a substitute data generating process (3). For example, according to the example in FIG. 5, the data blocks N6 and N7 are, if coincident at 80% or more, determined to be the data blocks in which substantially the same picture is displayed (i.e., this is approximate to a statistic picture) or substantially the same sound consecutively flows. Then, on the occasion of averaging into M7, the information quantity is originally given by $(^{73}/_{81}+^{73}/_{81}+1)/=^{227}/_{243}$ that is as small as the normal information quantity, however, the information quantity of the substitute data block to be generated is set such as $(^{73}/_{81}+^{73}/_{81}+1+^{16}/_{81})/3=^{243}/_{243}$ by executing the substitute data generating process (3) after adding $^{16}/_{81}$ of the data of N7, thereby enabling the information quantity and the speed by appearance to be equalized to the normal information quantity and the normal speed. Hereafter, the substitute data generating process is not conducted till the next missing data is detected, and the output signal based on the input data is output.

<Processing Flow>

Figure 7:
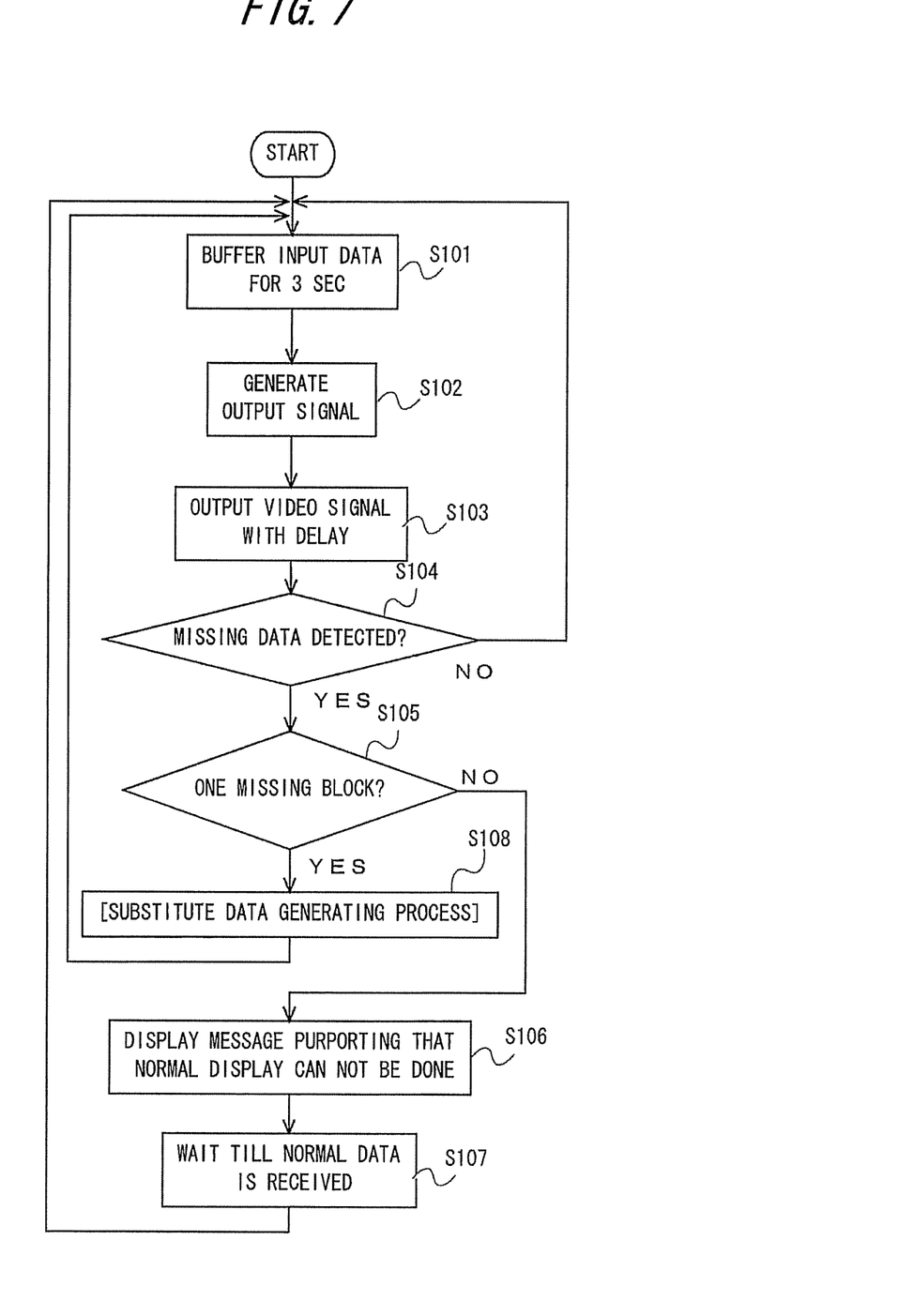
FIG. 7 is a flowchart illustrating a flow of a whole signal output process in the embodiment.
Figure 8:
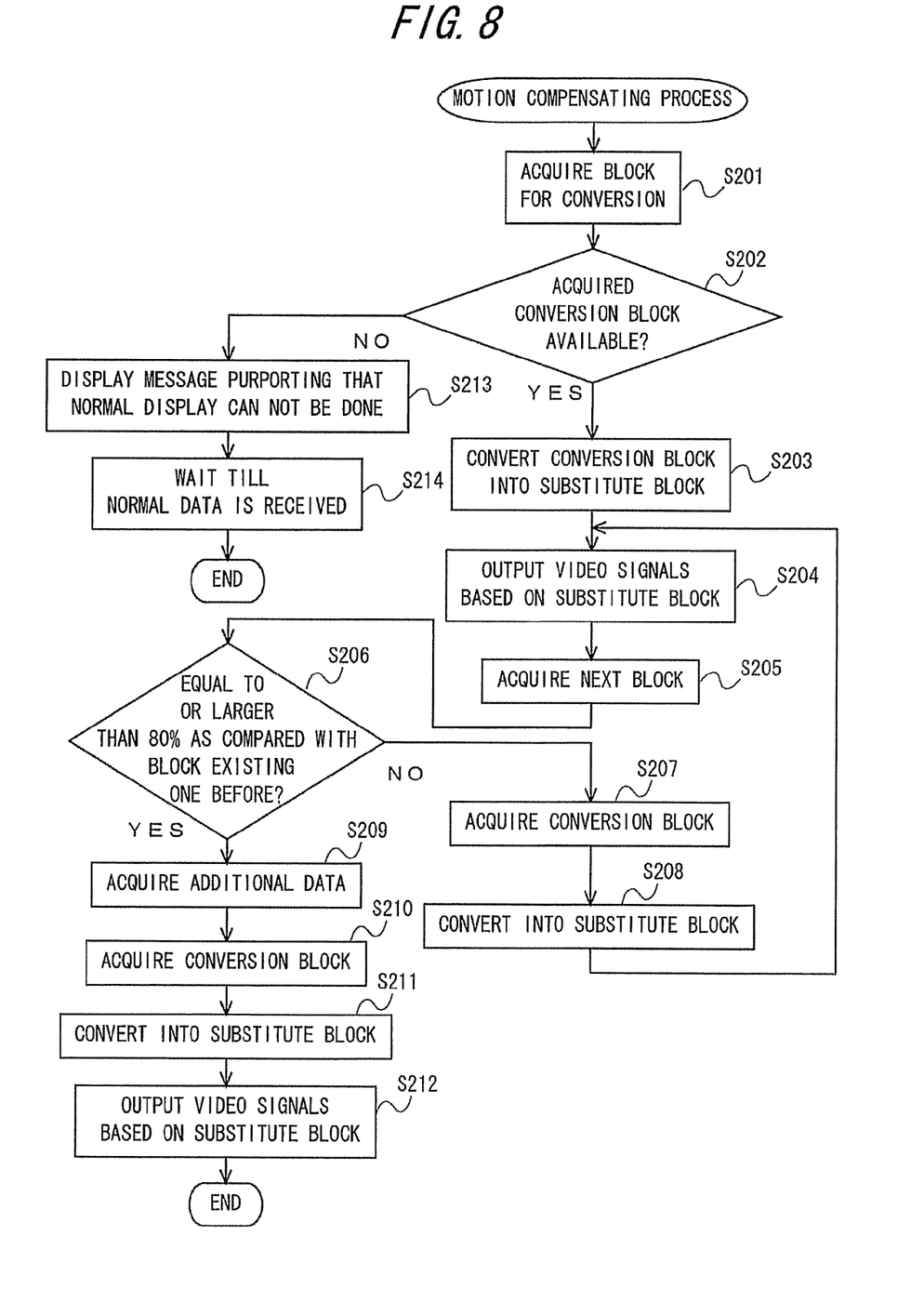
FIG. 8 is a flowchart illustrating the flow of the substitute data generating process in the embodiment.

FIGS. 7 and 8 illustrate a processing flow of the personal computer 10. FIG. 7 is a flowchart illustrating a flow of the entire signal output process in the embodiment. The execution of the signal output process depicted in the flowchart is triggered by such an operation that the detecting unit 22 receives (detects) a TV viewing start operation on the operating unit 18 and issues a signal output process start instruction to the output control unit 21.

In step S101, the data for 3-sec, which has been output from the broadcast receiving unit 14, is buffered. The buffer unit 26 buffers the data output from the broadcast receiving unit 14 for 3 sec as the reproducing time. Thereafter, the processing proceeds to step S102.

In step S102, the output signals are generated. The output signal generating unit 23 acquires the input data from the buffer unit 26, and generates the video signals and the audio signals on the basis of the acquired input data. Herein, the video signal is defined as information containing the picture of each frame required for displaying the moving picture. Thereafter, the processing proceeds to step S103.

In step S103, the video signals are output with a delay. The output control unit 21 outputs, to the display unit 40, in the status where the input data for 3 sec is buffered, the video signals and the audio signals generated by the output signal generating unit 23 in a way that delays these signals for 3 sec measured since the time when receiving the broadcast. Namely, the output control unit 21 outputs the signals with the 3-sec delay by use of the buffer unit 26. Thereafter, the processing proceeds to step S104.

In step S104, the missing of the data is monitored. The detecting unit 27 monitors whether or not the input data buffered by the buffer unit 26 contains the data block with deficiency of the information, i.e., whether the missing of the data occurs or not. If the missing data is not detected, the processes given in step S101 through step S104 are repeated. Whereas if the missing data is detected, the processing proceeds to step S105.

In step S105, it is determined whether the data block containing the missing data is single (i.e., for 1 sec) or not. The detecting unit 27 specifies the data block containing the missing frame detected in step S104 and further determines whether the data block containing the missing frame is single or not. If the data block containing the missing frame is determined to be single, the processing proceeds to step S108. Whereas if the data block containing the missing frame is determined not to be single (there are two or more data blocks containing the missing frames), the processing proceeds to step S106.

In step S106, a message purporting that the normal display can not be done is displayed. The output control unit 21 detects that the substitute data generating unit 28 can not generate the substitute data, and outputs the video signals containing the message purporting that the normal display can not be done to the display unit 40. Upon receiving these signals, the message purporting that the normal display can not be done is displayed on the display unit 40, thereby enabling the viewer to grasp that a viewing-disabled-status occurs due to some factor. Thereafter, the processing proceeds to step S107.

In step S107, a standby process till the normal data is received is executed. When the broadcast receiving unit 14 receives the normal data, the processing proceeds to step S101, in which the output and the display of the picture resume.

In step S108, the substitute data generating process is executed. The substitute data generating unit 28 acquires, as the data block for conversion, the data block anterior to the missing data block but posterior to the data block related to the output of the output control unit at that point of time from the input data buffered by the buffer unit 26, and averages the data bock for conversion into the substitute data block for the reproducing time (which is 3 sec in the embodiment) obtained by adding the data block reproducing time (which is 1 sec in the embodiment) of the missing frame to the reproducing time (2 sec in the embodiment) related to the data block for conversion, thereby generating the substitute data. An in-depth description of the substitute data generating process will be made later on with reference to FIG. 8. Thereafter, the processing proceeds to step S101.

FIG. 8 is a flowchart illustrating a flow of the substitute data generating process in the embodiment. The substitute data generating process depicted in this flowchart corresponds to step S108 illustrated in FIG. 7.

In step S201, the data blocks for conversion are acquired. The substitute data generating unit 28 acquires, as the data blocks for conversion, the data blocks anterior by one and two (i.e., the data blocks for 2 sec) to the missing data block from the input data buffered by the buffer unit 26. To describe this operation by taking FIG. 4 for example, if the data block N5 is missed, N3 and N4 are acquired as the data blocks for conversion. Thereafter, the processing proceeds to step S202.

In step S202, it is determined whether the acquired data blocks for conversions are usable or not. The substitute data generating unit 28 determines whether or not the conversion-oriented data blocks acquired in step S201 are the normal data blocks usable for generating the substitute data. If the acquired conversion-oriented data blocks are determined to be unusable as the data blocks for conversion because of these data blocks containing the missing frames of the data and so on, the processing proceeds to step S213. Whereas if the acquired conversion-oriented data blocks are determined to be usable as the data blocks for conversion, the processing proceeds to step S203.

In step S203, the data blocks for 2 sec acquired as the conversion-oriented data blocks are averaged into the substitute data blocks for 3 sec. The substitute data generating unit 28 averages the data blocks for 2 sec acquired as the data blocks for conversion into the substitute data blocks for the reproducing time (which is 3 sec in the embodiment) obtained by adding the reproducing time (1 sec in the embodiment) of the data block of the missing frame to the reproducing time (2 sec in the embodiment) related to the data blocks for conversion. According to the example in FIG. 4, the data blocks N3 and N4 for totally 2 sec (for 2 blocks) are averaged into the substitute data blocks M3, M4, M5 for 3 sec. Thereafter, the processing proceeds to step S204.

In step S204, the video signals based on the substitute data blocks are output. The substitute data generating unit 28 generates the output signals on the basis of the substitute data blocks M3, M4, M5 obtained in step S203. The thus-generated output signals are sequentially output as the video signals and the audio signals by the output control unit 21 to the display unit 40. Thereafter, the processing proceeds to step S205.

In step S205, the next data block is acquired. The substitute data generating unit 28 acquires the data block, which will become a next output target block, from the buffer unit 26. Thereafter, the processing proceeds to step S206.

In step S206, the new input data block is compared with the data block anterior by one. The substitute data generating unit 28 calculates a coincidence rate of contents of the data by comparing the data of the newly inputted data block with the data of the data block anterior by one to this newly inputted data block, and determines whether the coincidence rate is equal to or larger than a predetermined value (e.g., 80%) or not. Herein, the predetermined value is set to a value from which it can be detected that the data blocks to be compared with each other are approximate to such a degree as not to cause the viewer to have the sense of discomfort even when finishing the slow reproduction hereat. In the case of having the coincidence rate equal to or larger than the predetermined value, the processing proceeds to step S209. Whereas if the coincidence rate is equal to or smaller than the predetermined value, the processing proceeds to step S207.

In step S207, the next data block for conversion is acquired. The substitute data generating unit 28 acquires the two anterior substitute data blocks (i.e., close to the output target data block) among the three substitute data blocks acquired in the substitute data processing process of the last time. According to the example in FIG. 5, for obtaining the substitute data block M4 that is output in place of the data block N4 acquired in step S205, the substitute data generating unit 28 acquires the substitute data blocks M2 and M3 obtained in the substitute data generating process executed last time. Thereafter, the processing proceeds to step S208.

In step S208, the data block for conversion and the output target data block are averaged into the substitute data blocks for 3 sec. The substitute data generating unit 28 averages the data blocks acquired in step S205 and step S207, thereby obtaining the substitute data block that is output in place of the next output target data block. According to the example in FIG. 5, for obtaining the substitute data block M4 that is output as the substitute for the data block N4, the substitute data generating unit 28 acquires the data block N4 and the substitute data blocks M2 and M3 obtained in the substitute data generating process of the last time, and averages these three data blocks, thereby obtaining the substitute data block M4 that does not give any sense of discomfort to the viewer in the case of being consecutively output to the substitute data block M3 which has been output just before this operation. Thereafter, the processing proceeds to step S204.

In step S209, additional data is acquired. The substitute data generating unit 28 calculates how many times the information quantity (the speed by appearance when reproduced) per data block is as large or small as the normal information quantity in the substitute data generating process up to this point of time, and further calculates, based on the thus-calculated value, the data quantity that may be added, thereby acquiring the additional data having the calculated quantity. For instance, according to the example in FIG. 5, in the case of generating the substitute data block M7 without adding the additional data, the information quantity is $227/243$ as small as the normal information quantity, which is given by $(73/81+73/81+1)/3=227/243$. Hence, the information of $16/18$ is further acquired from N7 in order to generate the substitute data block M7 having the information quantity equal to the normal information quantity. Thereafter, the processing proceeds to step S210.

The processes in step S210 through step S212 are substantially the same as the processes explained in steps S207, S208 and S204. The substitute data block generated in step S211 has, however, the information quantity equal to the normal information quantity because of the additional data being added to the pre-averaging data in step S209. Namely, the substitute data generating process is herein terminated, and hereafter the normal output process is executed till the missing of the data occurs again. Thereafter, the processes illustrated in the flowchart come to an end, and the processing loops back to step S101 in FIG. 7.

The processes in steps S213 and S214 are substantially the same as the processes explained in steps S106 and S107. Thereafter, the processes illustrated in the flowchart come to the end, and the processing loops back to step S101 in FIG. 7.

Modified Example

Note that the input data has the data block on the per-second basis and is buffered for 3 sec, and the substitute data is generated on the per-3-block basis in the embodiment, however, it is preferable that optimal values are properly selected as these values according to the embodiment. For example, the input data has the data block on a per-0.5-sec basis, in which case an assumption is that the buffer time is set to 2 sec and the substitute data is generated on a per-4-block basis, and an initial information quantity of the substitute data block generated in response to the missing data becomes $3/4$ as small as the normal information quantity, thereby enabling the interpolation to be conducted, which is harder to give the sense of discomfort to the viewer.

FIGS. 7 and 8 illustrate the example in which the programs executed on the CPU 11 actualize the internal configuration (components) of the personal computer 10 depicted in FIG. 2, i.e., the detecting unit 22, the broadcast receiving unit 14, the output control unit 21, the output signal generating unit 23, the buffer unit 26, the detecting unit 27, the substitute data generating unit 28 and the output control unit 21. In place of this configuration, however, as described in <Configuration of Personal Computer>, any one or more components of the internal configuration of the personal computer 10 may be realized by processors or hardware circuits different from the CPU 11. The respective components in FIG. 2 may be constructed of the different processors or digital circuits, depending on a performance and a throughput of the CPU 11. Even in the case of including the processors or the digital circuits other than the CPU 11, the processing procedures thereof are the same as the procedures illustrated in FIGS. 7 and 8. Namely, the personal computer 10 in the embodiment can be actualized as the programs of the CPU 11 or by the dedicated processors or further by the dedicated digital circuits.

<Readable-by-Computer Recording Medium>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a DAT, an 8 mm tape, a memory card, etc are given as those removable from the computer. Further, a hard disc, a ROM (Read-Only Memory), etc are given as the recording mediums fixed within the computer etc.

<Second Embodiment>

Hitherto, one-segment broadcasting (1-seg broadcasting) can be viewed by use of a personal computer connected to a tuner and an antenna each capable of receiving the one-segment broadcasting. Herein, the personal computer is mounted with a variety of devices and might therefore generate from itself radio waves which hinders reception of the one-segment broadcasting. For example, when a DVD drive for reading and writing a DVD (Digital Versatile Disk) starts reading the DVD, electric power momentarily reaches its peak, and the radio waves hindering the preferable reception of the one-segment broadcasting are generated due to influence thereof. Furthermore, in the case of viewing the one-segment broadcasting with a mobile device such as a notebook type personal computer, a receiving state does not become preferable as the case may be due to its movement and ambient conditions.

In these cases, neither video data nor the audio data is output from the one-segment tuner, a part or whole of the data is missed, and consequently such a phenomenon occurs that the picture and the sound are blacked out or disturbed. For others, without being limited to the influence of the radio waves emitted from the devices, the data is missed for some cause, resulting in the occurrence of the phenomenon that the picture and the sound are blacked out or disturbed.

It is an object of the present embodiment, which was devised in view of the problems described above, to output the video signals or the audio signals that do not give a sense of discomfort to a viewer even when a part of moving picture data or audio data is missed.

According to the present embodiment, for solving the problems given above, portions anterior and posterior to a missing portion are slow-reproduced, thereby enabling the output of the video signals or the audio signals that do not give any sense of discomfort to the viewer even when a part of the moving picture data or the audio data is missed.

Specifically, the present embodiment is a signal output device including: an output signal generating unit generating output signals based on input data defined as inputted moving picture data or audio data; an output control unit outputting the output signals generated by the output signal generating unit to a reproducing device; a detecting unit detecting missing of the input data; and a substitute data generating unit generating, when the detecting unit detects the missing of the input data, with the exception of a portion with the missing detected, substitute data by averaging at least any one of input data posterior to the missing portion and input data anterior to the missing portion, as data for a period of reproducing time obtained by adding a period of reproducing time related to the input data to a period of reproducing time related to the missing portion, wherein the output signal generating unit, when the detecting unit detects the missing of the input data, generates the output signals based on the substitute data.

The signal output device according to the present embodiment is a device which outputs the output signals based on the inputted moving picture data or audio data. The input data may be the moving picture data or the audio data (e.g. the TS (Transport Stream) signals output from the one-segment tuner) received via broadcasting and streaming, and may also be the moving picture data or the audio data based on MPEG (Moving Pictures Experts Group) Standard, which is read from a storage medium such as DVD (Digital Versatile Disc) and HDD (Hard Disk Drive). When the present embodiment is applied to the moving picture data or the audio data received via the broadcasting and the streaming, it is possible to cope with the problems such as the missing of the received data, and, when the present embodiment is applied to the moving picture data or the audio data read from the storage medium like the DVD, it is feasible to cope with the problems such as a failure in reading the data and damaged data, which are caused by a flaw in the disk.

Moreover, the output signals are the video signals and the audio signals to be output and are, e.g., analog signals or digital signals output to a reproducing device such as a display and a loud speaker and, for others, a picture recording device and a sound recording device. The output signal generating unit generates the output signals based on the input data, and the output control unit outputs the generated output signals to the reproducing device etc.

The detecting unit monitors the input data and detects the missing of the data. The missing of the data includes the missing of the data which occurs on a communication route due to the radio waves and the missing of the original data from the beginning. According to the present embodiment, the missing of the data such as this is detected, and the data of the missing portion is interpolated by averaging at least one of the data anterior to the missing portion and the data posterior thereto. The data to be averaged may be both of the posterior data and the anterior data. Note that the term "posterior" indicates a direction of the future on a time base related to the reproduction of the input data, while "anterior" indicates a direction of the past on the same time base.

According to the present embodiment, the term "averaging" connotes converting a certain item of input data into data for a predetermined length of reproducing time in a way that supplements deficient data by executing a prediction process of the input data on the basis of this input data. For example, if the data for 1 sec as the reproducing time is missed, totally 4-sec data anterior and posterior to this missing data is averaged as 5-sec data, which 5-sec including the 1-sec of the missing data. Herein, it is preferable that a unit and a quantity of the data used for the interpolation are properly set according to the embodiment. Note that when the output signals based on the thus-generated substitute data are output, it follows that a predetermined quantity of information is allocated to a longer period of reproducing time than an originally intended period of time, resulting in the slow-reproduction.

Namely, according to the present embodiment, it is feasible to output the video signals and the audio signals that do not give a sense of discomfort to the viewer without causing intermittence and disturbance of the output signals even when the missing of the data occurs.

Further, in the signal output device according to the present embodiment, the detecting unit may detect the missing of the input data by monitoring the input data posterior by a predetermined period of time from an output portion of the output control unit, and the substitute data generating unit, when the detecting unit detects the missing of the input data, may execute: a first substitute data generating process of generating data for conversion and the substitute data substituting for the input data of the missing portion by averaging the data for conversion defined as the input data anterior to the missing portion in the input data but posterior to the output portion, as the data for the reproducing time obtained by adding the reproducing time related to the data for conversion to the reproducing time related to the missing portion; and a second substitute data generating process of generating the substitute data substituting for subsequent input data by adding the subsequent input data defined as the input data subsequent to just-before substitute data to the just-before substitute data defined as the substitute data generated just before and averaging these added pieces of data.

The detecting unit detects the missing of the data by monitoring the input data that is more posterior by the predetermined period of time than the output portion, whereby it is presumed that just when detecting the missing of the input data, the not-yet-output data usable for interpolating the detected missing portion may exist posterior to the output portion. In the first substitute data generating process, the substitute data for generating the output signals of the not-yet-output portion and the missing portion is generated by averaging the not-yet-output data for conversion. For instance, if the detecting unit detects the missing of the input data by monitoring the input data that is more posterior by 3 sec than the output portion, it follows that the not-yet-output data for less than 3 sec exists posterior to the present output portion but anterior to the missing portion, and the missing portion can be interpolated by use of this not-yet-output data.

The second substitute data generating process is a process executed subsequent to the first substitute data generating process and repeatedly executed till the interpolating process is thereafter finished. Even in the case of interpolating the missing portion in the first substitute data generating process, the partial video or audio data has been missed, and hence, if returned to the normal output process as it is, a picture omission and a sound omission are to occur, which causes the viewer to have the sense of discomfort. Therefore, according to the present embodiment, the subsequent input data is added to the just-before substitute data, and the added data is averaged, thereby generating the substitute data which substitutes for the subsequent input data.

According to the present embodiment, the second substitute data generating process is executed subsequent to the first substitute data generating process, and the missing portion is interpolated by use of the data anterior and posterior to the missing portion, whereby it is possible to output the video signals and the audio signals that do not give the sense of discomfort to the viewer.

Moreover, in the signal output device according to the present embodiment, the detecting unit may compare the subsequent input data with the input data posterior to the subsequent input data and thus determine whether or not the subsequent input data and the input data posterior thereto have coordinate data at a rate exceeding a predetermined rate, and the substitute data generating unit may further execute, if the detecting unit determines that the subsequent input data and the input data posterior thereto have the coordinate data at the rate exceeding the predetermined rate, a third substitute data generating process of calculating a ratio of the information quantity of the just-before substitute data to the information quantity of the normal input data, and generating the substitute data having the information quantity equal to the information quantity of the normal input data by adding the subsequent input data for the information quantity based on a result of the calculation to the just-before substitute data and averaging the added pieces of data.

The second substitute data generating process is executed subsequent to the first substitute data generating process, thereby enabling the output to be performed, which does not give the sense of discomfort to the viewer. In the present embodiment, however, the missing portion is interpolated by conducting the process of adding the data having the information quantity equal to the information quantity of the normal data and thus averaging the data. Hence, the information quantity of the substitute data to be generated becomes approximate to the information quantity equal to the information quantity of the normal data by repeating the averaging process, however, the substitute data generated by this repetition does not reach the information quantity equal to the information quantity of the normal data. Such being the case, a scheme of the present embodiment is that if the subsequent input data and the input data posterior to this data have the coordinate data at a rate exceeding a predetermined rate (e.g., 80%), it is determined that these two pieces of data have almost no difference, and the data is averaged by further adding the deficient information from the subsequent data, thereby generating the substitute data having the information quantity equal to the information quantity of the normal data. Even when the deficient information is further added from the subsequent data, there is almost no difference between the subsequent input data and the input data posterior thereto (if in the case of a moving picture, this picture is approximate to a static picture, and, if in the case of the sounds, these sounds are approximate to a continuation of the same sound), and hence the sense of discomfort is not given to the viewer.

According to the present embodiment, even in such a case that the missing of the data is detected and the interpolating process using the substitute data is started, the interpolating process is terminated so as not to give the sense of discomfort to the viewer owing to the third substitute data generating process, and the operation can be returned to the normal output process.

Furthermore, the signal output device according to the present embodiment may further comprise a buffer unit buffering a predetermined quantity of input data, wherein the output control unit may output the output signals to the reproducing device with a delay of a predetermined period of time since the time when the input data has been inputted in a status where the predetermined quantity of input data is buffered, and the substitute data generating unit, when the detecting unit detects the missing of the input data, may acquire the data for conversion from the buffer unit and generates the substitute data.

The data is output with the predetermined time of delay by use of the buffer unit, whereby the detecting unit can monitor the input data that is more posterior by the predetermined time than the output portion of the output control unit. The use of this method enables the substitute data generating process according to the present embodiment to be applied to the input data via the broadcasting and the streaming.

Moreover, the present embodiment may be an information device further including, in the signal output device, a reproducing device reproducing a picture or a sound based on signals output by the output control unit.

Further, the present embodiment can be grasped by way of a method executed by a computer or by way of a program making the computer to execute the method. Still further, the present embodiment may also be a recording medium recorded with the program such as this, which can be read by the computer, other devices and machines. Herein, the recording medium readable by the computer etc connotes a recording medium capable of storing information such as data, programs, etc. electrically, magnetically, optically, mechanically or by chemical action, which can be read from the computer etc.

The present embodiment enables the output of the video signals or the audio signals that do not give the sense of discomfort to the viewer even when a part of the moving picture data or the audio data is missed.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A signal output device comprising:
   an output signal generating unit generating output signals based on input data defined as inputted moving picture data or audio data;
   an output control unit outputting the output signals generated by said output signal generating unit to a reproducing device;
   a detecting unit detecting missing of the input data; and
   a substitute data generating unit generating, when said detecting unit detects the missing of the input data, substitute data by averaging at least any one of input data posterior to the missing portion and input data anterior to the missing portion, as data for a period of reproducing time obtained by adding a period of reproducing time related to the input data to a period of reproducing time related to the missing portion,
   wherein said output signal generating unit, when said detecting unit detects the missing of the input data, generates the output signals based on the substitute data,
   said detecting unit detects the missing of the input data by monitoring the input data posterior by a predetermined period of time from an output portion of said output control unit, and
   said substitute data generating unit, when said detecting unit detects the missing of the input data, executes:
   a first substitute data generating process of generating data for conversion and the substitute data substituting for the input data of the missing portion by averaging the data for conversion defined as the input data anterior to the missing portion in the input data but posterior to the output portion, as the data for the reproducing time obtained by adding the reproducing time related to the data for conversion to the reproducing time related to the missing portion; and
   a second substitute data generating process of generating the substitute data substituting for subsequent input data by adding the subsequent input data defined as the input data subsequent to just-before substitute data to the just-before substitute data defined as the substitute data generated just before and averaging these added pieces of data.

2. A signal output device according to claim 1, wherein said detecting unit compares the subsequent input data with the input data posterior to the subsequent input data and thus determines whether or not the subsequent input data and the input data posterior thereto have coordinate data at a rate exceeding a predetermined rate, and said substitute data generating unit further executes, if said detecting unit determines that the subsequent input data and the input data posterior thereto have the coordinate data at the rate exceeding the predetermined rate, a third substitute data generating process of calculating a ratio of the information quantity of the just-before substitute data to the information quantity of the normal input data, and generating the substitute data having the information quantity equal to the information quantity of the normal input data by adding the subsequent input data for the information quantity based on a result of the calculation to the just-before substitute data and averaging the added pieces of data.

3. A signal output device according to claim 1, further comprising a buffer unit buffering a predetermined quantity of input data,
   wherein said output control unit outputs the output signals to said reproducing device with a delay of a predetermined period of time since the time when the input data has been inputted in a status where the predetermined quantity of input data is buffered, and
   said substitute data generating unit, when said detecting unit detects the missing of the input data, acquires the data for conversion from said buffer unit and generates the substitute data.

4. A signal output method by which a computer executes:
   output signal generating involves generating output signals based on input data defined as inputted moving picture data or audio data;
   outputting the output signals generated in said output signal generating to a reproducing device;
   detecting missing of the input data; and
   substitute data generating involves generating, when the missing of the input data is detected in said detecting, with exception of a portion with the missing detected, substitute data by averaging at least any one of input data posterior to the missing portion and input data anterior to the missing portion, as data for a period of reproducing time obtained by adding a period of reproducing time related to the input data to a period of reproducing time related to the missing portion,
   wherein said output signal generating includes, when detecting the missing of the input data in said detecting, generating the output signals based on the substitute data,
   said detecting includes detecting the missing of the input data by monitoring the input data posterior by a predetermined period of time from an output portion in said outputting, and
   said substitute data generating includes, when detecting the missing of the input data in said detecting, executing:
   a first substitute data generating process of generating data for conversion and the substitute data substituting for the input data of the missing portion by averaging the data for conversion defined as the input data anterior to the missing portion in the input data but posterior to the output portion, as the data for the reproducing time obtained by adding the reproducing time related to the data for conversion to the reproducing time related to the missing portion; and
   a second substitute data generating process of generating the substitute data substituting for subsequent input data by adding the subsequent input data defined as the input data subsequent to just-before substitute data to the just-before substitute data defined as the substitute data generated just before and averaging these added pieces of data.

5. A signal output method according to claim 4, wherein said detecting includes comparing the subsequent input data with the input data posterior to the subsequent input data and thus determining whether or not the subsequent input data and the input data posterior thereto have coordinate data at a rate exceeding a predetermined rate, and said substitute data generating includes further executing, if it is determined in said detecting that the subsequent input data and the input data posterior thereto have the coordinate data at the rate exceeding the predetermined rate, a third substitute data generating process of calculating a ratio of the information quantity of the just-before substitute data to the information quantity of the normal input data, and generating the substitute data having the information quantity equal to the information quantity of the normal input data by adding the subsequent input data for the information quantity based on a result of the calculation to the just-before substitute data and averaging the added pieces of data.

6. A signal output method according to claim 4, wherein said computer further executes buffering a predetermined quantity of input data, said outputting includes outputting the output signals to said reproducing device with a delay of a predetermined period of time since the time when the input data has been inputted in a status where the predetermined quantity of input data is buffered, and said substitute data generating includes, when said detecting detects the missing of the input data, acquiring the data for conversion in said buffering and generating the substitute data.

7. A non-transitory readable-by-computer recording medium recorded with a signal output program for making a computer execute:

output signal generating involves generating output signals based on input data defined as inputted moving picture data or audio data;

outputting the output signals generated in said output signal generating to a reproducing device;

detecting missing of the input data; and substitute data generating involves generating, when the missing of the input data is detected in said detecting, with exception of a portion with the missing detected, substitute data by averaging at least any one of input data posterior to the missing portion and input data anterior to the missing portion, as data for a period of reproducing time obtained by adding a period of reproducing time related to the input data to a period of reproducing time related to the missing portion, wherein said output signal generating includes, when detecting the missing of the input data in said detecting, generating the output signals based on the substitute data, said detecting includes detecting the missing of the input data by monitoring the input data posterior by a predetermined period of time from an output portion in said outputting, and said substitute data generating includes, when detecting the missing of the input data in said detecting, executing:

a first substitute data generating process of generating data for conversion and the substitute data substituting for the input data of the missing portion by averaging the data for conversion defined as the input data anterior to the missing portion in the input data but posterior to the output portion, as the data for the reproducing time obtained by adding the reproducing time related to the data for conversion to the reproducing time related to the missing portion; and a second substitute data generating process of generating the substitute data substituting for subsequent input data by adding the subsequent input data defined as the input data subsequent to just-before substitute data to the just-before substitute data defined as the substitute data generated just before and averaging these added pieces of data.

8. A non-transitory readable-by-computer recording medium recorded with a signal output program according to claim 7, wherein said detecting includes comparing the subsequent input data with the input data posterior to the subsequent input data and thus determining whether or not the subsequent input data and the input data posterior thereto have coordinate data at a rate exceeding a predetermined rate, and said substitute data generating includes further executing, if it is determined in said detecting that the subsequent input data and the input data posterior thereto have the coordinate data at the rate exceeding the predetermined rate, a third substitute data generating process of calculating a ratio of the information quantity of the just-before substitute data to the information quantity of the normal input data, and generating the substitute data having the information quantity equal to the information quantity of the normal input data by adding the subsequent input data for the information quantity based on a result of the calculation to the just-before substitute data and averaging the added pieces of data.

9. A non-transitory readable-by-computer recording medium recorded with a signal output program according to claim 7, further making said computer execute buffering a predetermined quantity of input data, wherein said outputting includes outputting the output signals to said reproducing device with a delay of a predetermined period of time since the time when the input data has been inputted in a status where the predetermined quantity of input data is buffered, and said substitute data generating includes, when said detecting detects the missing of the input data, acquiring the data for conversion in said buffering and generating the substitute data.

\* \* \* \* \*